Figure 2:
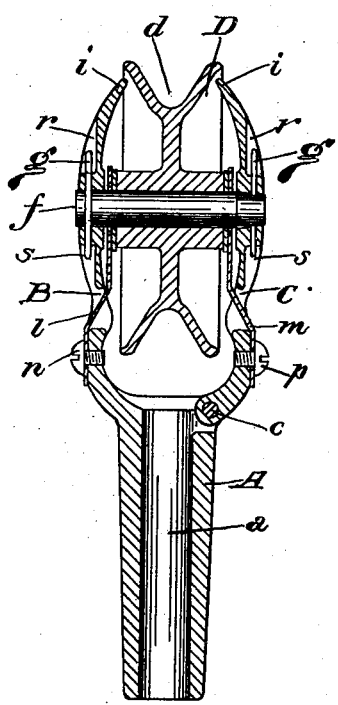

No. 742,331. PATENTED OCT. 27, 1903.
T. KELCH.
CASING FOR TROLLEY WHEELS.
APPLICATION FILED FEB. 2, 1903.
NO MODEL.

Witnesses
Elsie G. Reamer
W. S. Kyle

Inventor
Thomas Kelch
by Alfred M. Allen
Attorney

No. 742,331. Patented October 27, 1903.

UNITED STATES PATENT OFFICE.

THOMAS KELCH, OF NEWPORT, KENTUCKY, ASSIGNOR OF ONE-HALF TO WIRT W. TRIPP, OF COVINGTON, KENTUCKY.

CASING FOR TROLLEY-WHEELS.

SPECIFICATION forming part of Letters Patent No. 742,331, dated October 27, 1903.

Application filed February 2, 1903. Serial No. 141,606. (No model.)

*To all whom it may concern:*

Be it known that I, THOMAS KELCH, a citizen of the United States, residing at Newport, in the county of Campbell, in the State of Kentucky, have invented certain new and useful Improvements in Casings for Trolley-Wheels, of which the following is a full, clear, and exact description, reference being had to the accompanying drawings, forming part of this specification.

In the usual construction of casings for trolley-wheels or "trolley-harps," as they are called, the rigid casing for the wheel is slotted or bifurcated and the wheel is inserted between the bifurcations and journaled on a pin through the sides of the casing.

As is well known, trolley-wheels have to be renewed very frequently, and in the wintertime when troubled with sleet and ice a special form of trolley-wheel is made use of.

For the purpose of maintaining a better electrical contact between the trolley-wheel and the trolley-pole it is necessary also to provide contact-springs bearing against the hubs of the trolley-wheels and also to provide washers on the supporting-pin; otherwise the pins are burned out and destroyed very rapidly.

Now in the ordinary construction in order to renew the trolley-wheels or to insert special wheels for sleet and ice it is necessary to drive out of the casing the pin, then insert a new wheel, and, getting the washers and contact-springs in line, to drive the pin to place. The tension of the springs as soon as the pin is removed throws them out of line and they have to be pressed back into alinement as the new wheel is inserted, and as all this takes place on top of the car it usually takes from five to ten minutes to remove a worn wheel and mount a new one. In addition to this in the older constructions the wheel must be of course narrower than the bifurcated opening in order to insert a new wheel when the old one is worn, and therefore there is a space between the side of the wheel and the trolley-casing, and it frequently results that the operator in placing the trolley-wheel on the conducting-wire jams the wire between the side of the wheel and the casing, to the consequent damage of the trolley and the wire as the car is propelled, and in other ways also the wire becomes displaced and catches between the wheel and casing.

It is the purpose of my invention therefore to remedy these defects and to provide a casing for the trolley-wheel in which worn wheels may be instantly removed and replaced with new ones and, as a secondary object, in which it shall be impossible for the wire to catch between the wheel and the casing; and the invention consists in that novel construction and arrangement of parts to be hereinafter particularly pointed out and claimed, in which provision is made for hinging one of the sides of the casing and fixedly mounting the spindle for the trolley-wheel to allow for the ready mounting of new wheels as occasion may demand and in which the casing shall reënter the space underneath the flange of the wheel.

While the preferred form of my invention is that in which one member of the casing is hinged and the other fixed and the spindle is mounted to the fixed member, I do not necessarily limit myself to that construction, for it is obvious that both members may be hinged and the spindle mounted on either member.

Figure 1:
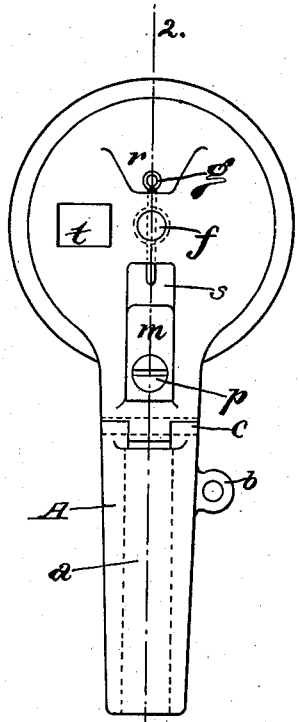
Figure 3:
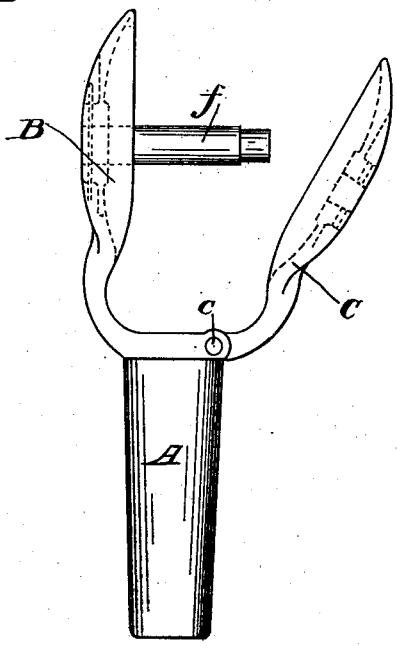

In the drawings, Figure 1 is a side elevation of my improved construction of trolley-wheels. Fig. 2 is a longitudinal section on lines 2 2 of Fig. 1. Fig. 3 is a side elevation of the casing with the wheel removed.

A is the body of the casing, provided with a socket $a$, in which the trolley-pole is riveted or otherwise secured and carrying an eye $b$, to which the operating trolley-rope is secured. One side, B, of the upper portion of the casing is rigid with the body, while the other side, C, is hinged on the pin $c$ to the body of the casing.

D is the trolley-wheel, of the usual construction, formed with the groove $d$ for the reception of the electric wire and a hub portion $e$ for mounting the same on the pin $f$, which passes through the side walls C B of the casing and is secured therein by the cotter-pins $g$ $g$. The outer surface of the side walls B C of the casing is spherical in its general contour, and the upper edge of each of the side walls reënters the hollow space underneath the flange of the trolley-wheel D, as shown at h i.

l m are the contact-springs, secured at the lower end by the screws n p to the casing and with their upper ends having spring-contact against the ends of the hub of the trolley-wheel. These springs have considerable tension to insure a good contact with the hub of the wheel, and it is usual to provide a flat circular contact-surface for the springs with a central hole for the passage of the supporting-pin. In addition washers are also used between the springs and hub to prevent undue wear or burning out of the wheel-bushings. It is therefore obvious if the pin is removed from the casing the ends of the springs, the washers, the holes in the casing, and the hub of the wheel must all be in line to permit the return of the pin to place.

In any construction in which both forks of the casing are rigid the pins have to be thus inserted, the springs must be pushed back to the casing-wall to bring the central holes in line, and the washers held in place, all of which is difficult to accomplish in the cramped space and with the trolley-casing mounted on the trolley-pole.

In my construction the pin is allowed to remain fixed or permanently secured in the casing, as shown in Fig. 3, the cotter-pin holding the other side is removed, and the hinged side C thrown out of the way, the old wheel is then instantly removed, a new wheel mounted on the pin, with the washers in the pin and the hinged side closed up, and the cotter-pin g driven back to place, all without the least loss of time. The opening in the casing is made very slightly oblong on the inside and the pins slightly rounded at their outer end to permit the casing to swing back to place, which it does with a slight snap when in actual use.

For securing the cotter-pins offsets r s are left in the outer face of the casing to permit of their insertion without leaving any portion of the cotter-pin exposed for catching the electric wire.

Another advantage derived from holding the pin f fixed in the half-casing while the other side is swung out of the way is that the hole for the cotter-pin for securing the hinged side will always remain in proper position and will not swing out of line, as frequently happens when the wheel-spindle is driven back to place in the older constructions. It will also be evident that with my construction of trolley-casing somewhat spherical in contour and with the upper edges of the casing entering under the flange of the trolley-wheel it will be impossible for the contact-wire to ever become jammed between the wheel and the casing.

t is an oil-opening in the face of each side of the casing to permit of the lubrication of the wheel-bearing.

Having thus described my invention, what I claim, and desire to secure by Letters Patent, is—

1. In a trolley-head, a casing comprising hinged members, and a spindle permanently mounted in one of said members and adapted to engage the other member.

2. In a trolley-head a casing comprising a fixed and a hinged member, and a spindle permanently mounted in one of said members and adapted to engage the other member.

3. In a trolley-head a casing comprising a fixed and a hinged member and a spindle permanently mounted in said fixed member and adapted to engage the hinged member.

4. In a trolley-head, a casing comprising a fixed and a hinged member, a spindle permanently mounted in said fixed member, said hinged member having a socket adapted to receive said spindle and means for locking the hinged member in closed position.

5. In a trolley-head a casing comprising a fixed and a hinged member, a spindle permanently mounted in said fixed member and adapted to engage said hinged member, in combination with a trolley-wheel revolubly mounted on said spindle, and contact-springs having openings for the passage of the spindle, said springs being secured to the head and adapted to bear against the trolley-wheel.

THOMAS KELCH.

Witnesses:
ALFRED M. ALLEN,
ELSIE G. SEAMER.